US012211496B2

(12) United States Patent
Lee

(10) Patent No.: US 12,211,496 B2
(45) Date of Patent: Jan. 28, 2025

(54) METHOD AND APPARATUS WITH UTTERANCE TIME ESTIMATION

(71) Applicant: Samsung Electronics Co., Ltd., Suwon-si (KR)

(72) Inventor: Min-Joong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1057 days.

(21) Appl. No.: 17/064,879

(22) Filed: Oct. 7, 2020

(65) Prior Publication Data

US 2021/0358493 A1 Nov. 18, 2021

(30) Foreign Application Priority Data

May 15, 2020 (KR) .................. 10-2020-0058322

(51) Int. Cl.
*G10L 15/00* (2013.01)
*G10L 15/02* (2006.01)
*G10L 15/22* (2006.01)
*G10L 15/07* (2013.01)

(52) U.S. Cl.
CPC .............. *G10L 15/22* (2013.01); *G10L 15/02* (2013.01); *G10L 15/07* (2013.01)

(58) Field of Classification Search
CPC ......... G10L 15/07; G10L 15/20; G10L 15/22; G10L 15/26; G10L 15/30; G10L 15/02; G10L 15/063; G10L 15/08; G10L 15/16; G10L 25/30; G10L 19/005; G10L 19/00; G10L 25/27
See application file for complete search history.

(56) References Cited

U.S. PATENT DOCUMENTS

| 7,584,098 B2 | 9/2009 | Yu et al. |
| 8,886,579 B2 | 11/2014 | De Sousa Webber |
| 9,728,185 B2 | 8/2017 | Schalkwyk et al. |
| 2014/0058987 A1 | 2/2014 | Ing |
| 2019/0057683 A1 | 2/2019 | Sak et al. |
| 2020/0126538 A1 | 4/2020 | Han et al. |

FOREIGN PATENT DOCUMENTS

| JP | 2008-210206 A | 9/2008 |
| KR | 10-2009-0123396 A | 12/2009 |
| KR | 10-2012-0048139 A | 5/2012 |
| KR | 10-2016-0133349 A | 11/2016 |

OTHER PUBLICATIONS

Ren, Yi, et al. "FastSpeech: Fast, Robust and Controllable Text to Speech." *33rd Conference on Neural Information Processing Systems*, Vancouver, Canada arXiv:1905.09263v5 Nov. 20, 2019 (13 pages in English).

(Continued)

*Primary Examiner* — Vu B Hang
(74) *Attorney, Agent, or Firm* — NSIP Law

(57) ABSTRACT

A processor-implemented utterance time estimation method includes: determining a plurality of attention weight matrices using an attention-based sequence-to-sequence model; selecting an attention weight matrix from the plurality of attention weight matrices; and estimating an utterance time corresponding to an output sequence based on the selected attention weight matrix.

22 Claims, 11 Drawing Sheets

(56) References Cited

OTHER PUBLICATIONS

Moritz, Niko, et al. "Streaming Automatic Speech Recognition with the Transformer Model." *International Conference on Acoustics, Speech and Signal Processing (ICASSP) Mitsubishi Electric Research Laboratories (MERL)*, Cambridge, MA, USA IEEE, 2020 pp. 6074-6078.

Partial European Search Report issued on Jul. 28, 2021 in counterpart European Patent Application No. 20209906.5 (15 pages in English).

Falk, Tiago H. et al., "Single-Ended Speech Quality Measurement Using Machine Learning Methods", *IEEE Transactions on Audio, Speech, and Language Processing*, vol. 14, Issue 6, Nov. 2006 (pp. 1935-1947).

Hinton, Geoffrey et al., "Deep Neural Networks for Acoustic Modeling in Speech Recognition", *IEEE Signal Processing Magazine*, vol. 29, Issue 6, Nov. 2012 (pp. 82-97).

Bahdanau, Dzmitry, et al. "End-to-End Attention-Based Large Vocabulary Speech Recognition", *2016 IEEE international conference on acoustics, speech and signal processing (ICASSP)*, Mar. 14, 2016 (pp. 1-8).

Dong, Linhao et al., "Speech-Transformer: A No-Recurrence Sequence-to-Sequence Model for Speech Recognition", *2018 IEEE International Conference on Acoustics, Speech and Signal Processing (ICASSP)*. 2018 (pp. 5884-5888).

Zhang, Jing-Xuan et al., "Sequence-to-Sequence Acoustic Modeling for Voice Conversion", *IEEE/ACM Transactions on Audio, Speech, and Language Processing*, vol. 27, Issue 3, Jan. 12, 2019 (pp. 1-13).

FIG. 8A

METHOD AND APPARATUS WITH UTTERANCE TIME ESTIMATION

CROSS-REFERENCE TO RELATED APPLICATIONS

This application claims the benefit under 35 USC § 119(a) of Korean Patent Application No. 10-2020-0058322 filed on May 15, 2020, in the Korean Intellectual Property Office, the entire disclosure of which is incorporated herein by reference for all purposes.

BACKGROUND

1. Field

The following description relates to a method and apparatus with utterance time estimation.

2. Description of Related Art

Speech recognition may refer to technology used to recognize or understand an acoustic speech signal, such as a vocal expression uttered by a human, by analyzing the acoustic speech signal using a computing device. A method of recognizing a speech based on a frequency characteristic or feature extracted from audio data may apply a hidden Markov model (HMM). Such HMM-based speech recognition method may recognize a speech by analyzing a pronunciation from audio data, and by combining words or sentences based on the analyzed pronunciation.

Such HMM-based speech recognition method may not directly recognize a text including a word or a sentence from audio data using an acoustic model including an artificial neural network, without analyzing a pronunciation from the audio data.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented utterance time estimation method includes: determining a plurality of attention weight matrices using an attention-based sequence-to-sequence model; selecting an attention weight matrix from the plurality of attention weight matrices; and estimating an utterance time corresponding to an output sequence based on the selected attention weight matrix.

The selecting of the selected attention weight matrix may include performing a monotonic regression analysis on the plurality of attention weight matrices and selecting the selected attention weight matrix based on a result of the monotonic regression analysis.

The estimating of the utterance time may include performing a monotonic regression analysis on the selected attention weight matrix and estimating the utterance time corresponding to the output sequence based on a result of the monotonic regression analysis.

The selected attention weight matrix may include, as elements, attention weights of input frames of an input sequence and that correspond to output tokens of the output sequence, and the estimating of the utterance time may include: selecting a predetermined number of high attention weights from the attention weights of the input frames; and estimating the utterance time corresponding to the output sequence based on the selected attention weights.

The estimating of the utterance time based on the selected attention weights may include: correcting the selected attention weight matrix based on the selected attention weights; and estimating the utterance time corresponding to the output sequence based on the corrected attention weight matrix.

The predetermined number of the high attention weights may be a predetermined number of highest attention weights among attention weights corresponding to each output token.

The estimating of the utterance time may include: performing a diffusion correction on the selected attention weight matrix; and estimating the utterance time corresponding to the output sequence based on the selected attention weight matrix on which the diffusion correction is performed.

The selected attention weight matrix may include, as elements, attention weights of input frames of an input sequence and that correspond to output tokens of the output sequence, and
the estimating of the utterance time may include: selecting a predetermined number of high attention weights from the attention weights of the input frames; performing a diffusion correction on the selected attention weight matrix based on the selected attention weights; and estimating the utterance time corresponding to the output sequence based on the selected attention weight matrix on which the diffusion correction is performed.

A number of the plurality of attention weight matrices may correspond to a product of a number of attention layers of the attention-based sequence-to-sequence model and a number of decoder layers of the attention-based sequence-to-sequence model.

The method may include training the attention-based sequence-to-sequence model so that a predetermined matrix among the plurality of attention weight matrices is generated as the selected attention weight matrix.

The training of the attention-based sequence-to-sequence model may include masking an attention layer corresponding to the predetermined matrix and training the attention-based sequence-to-sequence model based on the masked attention layer.

A non-transitory computer-readable storage medium may store instructions that, when executed by a processor, configure the processor to perform the method.

In another general aspect, a processor-implemented utterance time estimation method includes: receiving an input sequence; generating an encoded feature by encoding the input sequence; determining attention weights of input frames of the input sequence for each of at least one attention layer; estimating, for each of one or more steps, an output token of an output sequence based on the encoded feature and the attention weights; determining an input frame corresponding to the output token for each of the at least one attention layer, based on the attention weights; and estimating an utterance time corresponding to the output sequence based on the input frame corresponding to the output token.

The estimating of the utterance time may include: determining attention weight matrices for each of the at least one attention layer, based on the input frame corresponding to the output token; selecting an attention weight matrix corresponding to monotonic properties from the attention weight matrices for each of the at least one attention layer;

and estimating the utterance time corresponding to the output sequence based on the selected attention weight matrix.

The selecting of the attention weight matrix corresponding to monotonic properties from the attention weight matrices for each of the at least one attention layer may include: performing a monotonic regression analysis on the attention weight matrices; and selecting an attention weight matrix having a smallest error of the monotonic regression analysis as the attention weight matrix corresponding to monotonic properties In another general aspect, an utterance time estimation apparatus includes: a processor configured to determine a plurality of attention weight matrices using an attention-based sequence-to-sequence model, select an attention weight matrix from the plurality of attention weight matrices, and estimate an utterance time corresponding to an output sequence based on the selected attention weight matrix.

For the selecting of the selected attention weight matrix, the processor may be configured to perform a monotonic regression analysis on the plurality of attention weight matrices and select the selected attention weight matrix based on a result of the monotonic regression analysis.

For the estimating of the utterance time, the processor may be configured to perform a monotonic regression analysis on the selected attention weight matrix and estimate the utterance time corresponding to the output sequence based on a result of the monotonic regression analysis.

The selected attention weight matrix may include, as elements, attention weights of input frames of an input sequence and that correspond to output tokens of the output sequence, and for the estimating of the utterance time, the processor may be configured to: select a predetermined number of high attention weights from the attention weights of the input frames; and estimate the utterance time corresponding to the output sequence based on the selected attention weights.

For the estimating of the utterance time, the processor may be configured to: correct the selected attention weight matrix based on the selected attention weight; and estimate the utterance time corresponding to the output sequence based on the corrected attention weight matrix.

For the estimating of the utterance time, the processor may be configured to: perform a diffusion correction on the selected attention weight matrix; and estimate the utterance time corresponding to the output sequence based on the selected attention weight matrix on which the diffusion correction is performed.

The selected attention weight matrix may include, as elements, attention weights of input frames of an input sequence and that correspond to output tokens of the output sequence, and for the estimating of the utterance time, the processor may be configured to: select a predetermined number of high attention weights from the attention weights of the input frames; perform a diffusion correction on the selected attention weight matrix based on the selected attention weights; and estimate the utterance time corresponding to the output sequence based on the selected attention weight matrix on which the diffusion correction is performed.

A number of the plurality of attention weight matrices may correspond to a product of a number of attention layers of the attention-based sequence-to-sequence model and a number of decoder layers of the attention-based sequence-to-sequence model.

The processor may be configured to train the attention-based sequence-to-sequence model so that a predetermined matrix among the plurality of attention weight matrices is generated as the selected attention weight matrix.

The processor may be configured to mask an attention layer corresponding to the predetermined matrix and to train the attention-based sequence-to-sequence model based on the masked attention layer.

In another general aspect, a mobile apparatus includes: at least one sensor configured to receive an input sequence; and a processor configured to generate an encoded feature by encoding the input sequence, determine respective attention weights of input frames of the input sequence for each of at least one attention layer, estimate, for each of one or more steps, an output token of an output sequence based on the encoded feature and the attention weights, determine input frames corresponding to the output token for each of the at least one attention layer, based on the attention weights, and estimate an utterance time corresponding to the output sequence based on the input frames corresponding to the output token.

For the estimating of the utterance time, the processor may be configured to: determine attention weight matrices for each of the at least one attention layer, based on the input frame corresponding to the output token; select an attention weight matrix corresponding to monotonic properties from the attention weight matrices for each of the at least one attention layer; and estimate the utterance time corresponding to the output sequence based on the selected attention weight matrix.

The at least one sensor may include a microphone, the input sequence may include a speech, and further comprising a user interface configured to output the output sequence and the utterance time.

In another general aspect, a processor-implemented utterance time estimation method includes comprising: generating an encoded feature by encoding an input sequence including input frames; estimating output tokens of an output sequence corresponding to the input sequence, based on the encoded feature; determining attention weight matrices including attention weights, each attention weight corresponding to one of the input frames and one of the output tokens; and estimating an utterance time corresponding to an output sequence based on the attention weight matrices.

Other features and aspects will be apparent from the following detailed description, the drawings, and the claims.

BRIEF DESCRIPTION OF THE DRAWINGS

FIG. 8A illustrates an example of an utterance time estimation result.

Figure 1:
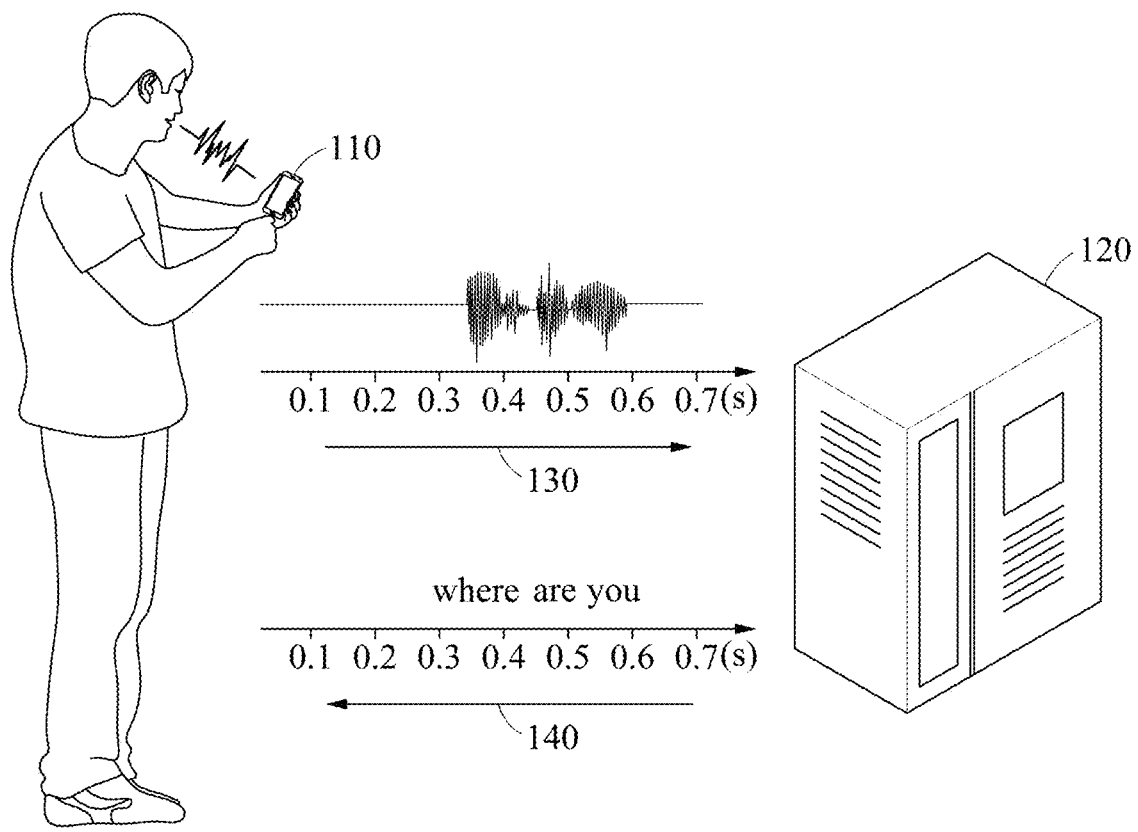
FIG. 1 illustrates an example of a speech recognition system.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following specific structural or functional descriptions merely describe examples, and the scope of this disclosure or such examples are not limited to the descriptions provided in the present specification. Various alterations and modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not intended to limit the disclosure. As used herein, the singular forms "a", "an" and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

A component having a common function with a component included in one example is described using a like name in another example. Unless otherwise described, description made in one example may be applicable to another example and detailed description within a duplicate range is omitted.

FIG. 1 illustrates an example of a speech recognition system.

Referring to FIG. 1, a speech recognition system may include a user terminal 110 and a speech recognition apparatus 120. In an example the speech recognition apparatus 120 may be an apparatus (e.g., a server device), external to the user terminal 110, and in another example the speech recognition apparatus 120 may be embedded or included in the user terminal 110, according to non-limiting examples.

In the speech recognition system, the user terminal 110 may be a terminal configured to receive an input sequence 130 of a speaker (e.g., an audio speech of a user or speaker), to transfer the input sequence 130 to the speech recognition apparatus 120, and to provide a user (e.g., the speaker) with an output sequence 140 that is a recognition result determined by the speech recognition apparatus 120. The user terminal 110 may be receive the input sequence 130 through at least one sensor (e.g., a microphone) of the user terminal 110, and may provide the output sequence through a user interface or display of the user terminal 110. Although the user terminal 110 is illustrated as a smartphone in FIG. 1, the user terminal 110 may be any one or any combination of electronic devices, for example, a computer, a ultra-mobile personal computer (UMPC), a workstation, a net-book, a personal digital assistant (PDA), a portable computer, a web tablet, a wireless phone, a mobile phone, an e-book, a portable multimedia player (PMP), a portable game console, a navigation device, a black box, and/or a digital camera.

In the speech recognition system, the speech recognition apparatus 120 may be a computing device configured to receive the input sequence 130 of the speaker and provide the output sequence 140 that is the recognition result. The input sequence 130 may include an input speech, and an input speech feature vector extracted from the input speech. The input speech may comprehensively include a mel-frequency cepstral coefficient (MFCC) or a spectrogram in which a wave file representing an input speech signal of a speaker in a wave from is represented in a form of a frequency. The computing device may be a mobile device (for example, a notebook computer, a laptop computer, a desktop computer, and/or a smartphone), however, examples are not limited thereto. For example, the computing device may include all types of devices including an operation or calculation means.

The speech recognition apparatus 120 may provide end-to-end speech recognition. In typical speech recognition, a hidden Markov model (HMM) may be used. Such typical HMM-based speech recognition may analyze pronunciation from audio data, and combine words or sentences based on the analyzed pronunciation. However, pronunciation may vary depending on speakers and types of languages of the speakers, and thus such typical recognition of a speech by analyzing pronunciation may disadvantageously include a correction process including a large number of trials and errors. In addition, the typical HMM-based speech recognition method may be vulnerable to ambient noise because a speech is recognized based on pronunciation.

In contrast to the typical speech recognition, an end-to-end artificial neural network (ANN)-based speech recognition system of one or more embodiments may exhibit excellent performance by using the ANN that is learned or trained to model signal processing, pronunciation conversion, language model, and/or decoding that used to implement speech recognition, while minimizing intervention of expert knowledge in the signal processing, the pronunciation conversion, the language model, and the decoding, thereby improving the functioning of speech recognition systems and apparatuses, and improving the technology field of speech recognition.

To provide the end-to-end speech recognition, the speech recognition apparatus 120 may construct a sequence-to-sequence model including an ANN, and provide, in response to the input sequence 130, the output sequence 140 that is the recognition result using the constructed sequence-to-sequence model. The ANN may be, for example, a recurrent neural network (RNN), a convolution neural network (CNN), a self-attention neural network (SANN), a bidirectional RNN (BRNN), a long short-term memory (LSTM) network, a bidirectional LSTM (BLSTM) network, a gated recurrent unit (GRU), and/or a bidirectional GRU (BGRU). However, examples are not limited to the examples described in the foregoing.

Also, the speech recognition apparatus 120 may be configured to estimate an utterance time corresponding to an output sequence and/or may include an utterance time estimation apparatus configured to estimate the utterance time corresponding to the output sequence.

The speech recognition apparatus 120 of one or more embodiments may use the utterance time estimation apparatus to determine and provide information about a point in time (e.g., an exact or substantially precise point in time) at which each word recognized in the input sequence 130 is uttered, as well as the output sequence 140 that is the recognition result of the input sequence 130.

When each recognized word is predicted by comprehensively considering an input sequence, a typical sequence-to-sequence model-based speech recognition method may not be capable of determining (or may not be configured to determine) a point in time at which each recognized word is uttered. In particular, when a plurality of attention layers that are trained to implicitly perform various functions are used to predict each recognized word, a typical multi-head attention sequence-to-sequence model may not be capable of estimating (or may not be configured to estimate) a point in time at which each recognized word is uttered.

In contrast to such typical method and model, a speech recognition system of one or more embodiments may determine and provide information about a point in time at which each recognized word in the output sequence 140 is uttered, using the utterance time estimation apparatus, even when implementing the sequence-to-sequence model-based speech recognition method, thereby improving the functioning of speech recognition systems and apparatuses, and improving the technology field of speech recognition. Non-limiting examples of such speech recognition system of one or more embodiments will be further described below with reference to FIGS. 2 through 9B.

Figure 2:
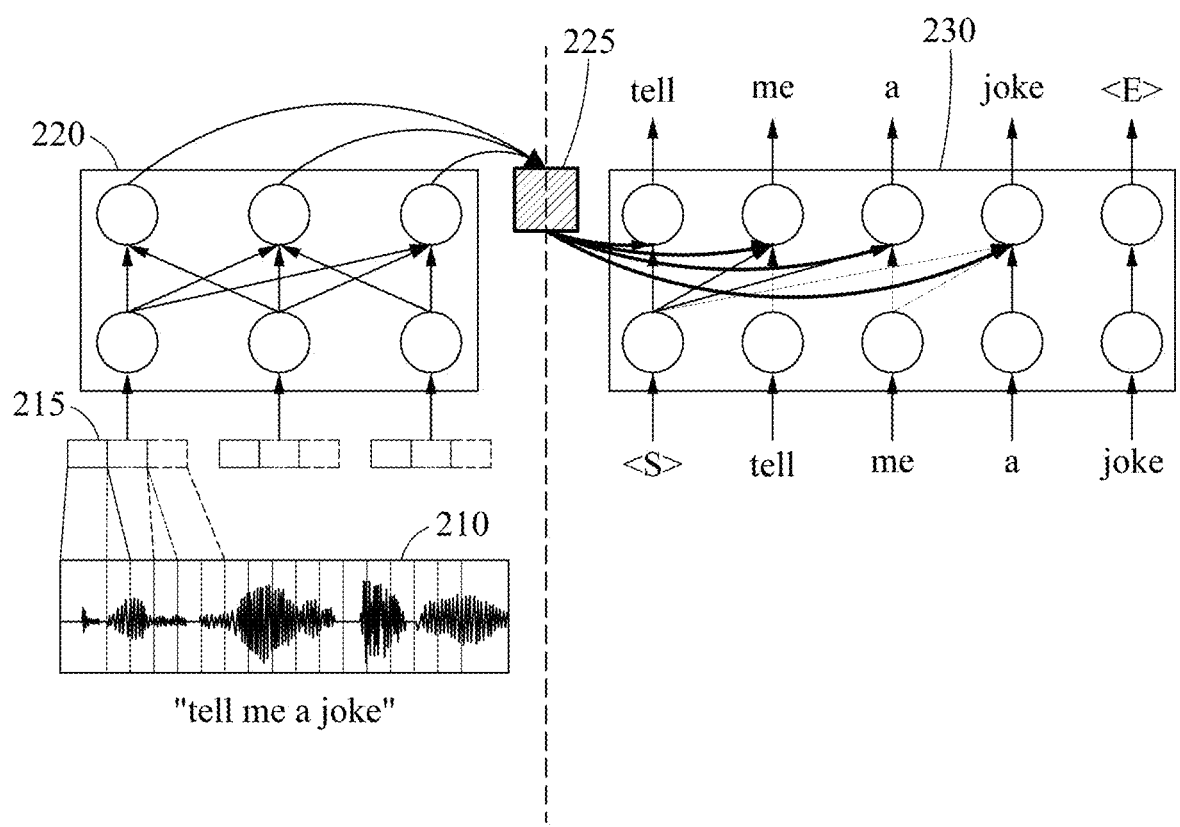
FIG. 2 illustrates an example of an operation of a speech recognition apparatus with an end-to-end artificial neural network (ANN) having an encoder-decoder structure.

FIG. 2 illustrates an example of an operation of a speech recognition apparatus with an end-to-end ANN having an encoder-decoder structure.

Referring to FIG. 2, an ANN may include an encoder 220 and a decoder 230.

The ANN may be an end-to-end ANN having a structure (hereinafter, referred to as an "encoder 220-decoder 230 structure") including the encoder 220 and the decoder 230. When a path through which all parameters of a model are simultaneously trained for one loss function, the encoder 220 and the decoder 230 may be simultaneously trained. An input may be received at one side (or an input) of the ANN and an output may be generated at another side (or an output) of the ANN. A network weight may be optimized by directly considering the input and the output. Nodes of layers in the ANN may have non-linear influences on each other, and parameters of the ANN (for example, values output from nodes or relationships among the nodes) may be optimized through training.

The end-to-end ANN having the encoder 220-decoder 230 structure may be a network structure in which the encoder 220 and the decoder 230 are integrated, and the encoder 220 and the decoder 230 may directly generate a recognition result corresponding to an input speech from the input speech.

The speech recognition apparatus may extract an input speech feature vector 215 from an input speech 210, and the encoder 220 may generate an encoded feature 225 by encoding the input speech feature vector 215. For example, the encoder 220 may generate the encoded feature 225 by transforming a dimension of the input speech feature vector 215. In other words, the encoder 220 may serve to effectively summarize the meaning of the input sequence.

The encoded feature 225 may be applied to the decoder 230 of the ANN. The decoder 230 may determine an output token as a unit of a token, based on the encoded feature 225 and a recognition result determined in advance.

For example, when the encoded feature 225 is received, the decoder 230 may output the recognition result as a unit of a token. A token may be, for example, a word, a subword, a character, or a unit (for example, initial, medial, and final sounds of Korean syllable structures) configuring a character. In the following description, the entire recognition result output by the decoder 230 may be referred to as an output sequence, and the output sequence may include output one or more tokens.

To calculate an output with an unspecified length, using the ANN, the decoder 230 may continue to predict subsequent tokens one by one in response to inputs of predicted output tokens until a special token (e.g., end <E> or end of speech <EOS>) indicating an end appears or is determined. For example, the decoder 230 may determine output tokens for each step based on information calculated from the encoder 220. In this example, the decoder 230 may determine an output token depending on output tokens of previous steps, and such a method may be referred to as "auto-regressive decoding."

For example, in an end-to-end ANN model that performs the auto-regressive decoding, a token selected as an output token may be determined as a subsequent input token. For example, when recognizing a sentence "tell me a joke" of the input speech 210, "me" may be recognized based on an input "tell" that is an output token recognized in a previous step.

However, when a typical end-to-end ANN having the encoder-decoder structure processes all portions of an input speech using a single vector, information of a front or beginning portion of an input speech used to estimate a subsequent output token may be increasingly diluted as the estimated speech becomes longer through sequential estimation of output tokens, which may lead to a reduction in a quality of speech recognition. To solve the above problem, for each step in which the decoder 230 estimates an output token, the speech recognition apparatus of one or more embodiments may estimate the output token by referencing or using all portions of an input speech in the encoder 220 (e.g., all portions of the encoded feature 225). Moreover, to even more accurately estimate each output token, for each step in which the decoder 230 estimates an output token, the speech recognition apparatus of one or more embodiments may not estimate the output token by referencing or using all the portions of the input speech at the same rate or attention. Rather, for each step in which the decoder 230 estimates an output token, the speech recognition apparatus of one or more embodiments may estimate the output token by referencing or using a portion of the input speech associated with the output token with a higher attention than other portions of the input speech. Accordingly, the speech recognition apparatus of one or more embodiments may improve the functioning of speech recognition systems and apparatuses, and improving the technology field of speech recognition.

For example, attention weights of input frames constituting an input sequence may be set based on a degree of association with an output token to be predicted in a corresponding step, and the decoder 230 may estimate output tokens for each step based on the set attention weights.

The encoder 220 and the decoder 230 may be pre-trained to generate a sequence of a recognition result from the received input speech feature vector 215. For example, model parameters (for example, a weight of a synaptic connection and a deflection of a node) of the encoder 220 and the decoder 230 may be pre-trained by training the encoder 220 and the decoder 230 to generate a sequence of a recognition result from a sequence of correct answer text pairs corresponding to an input speech. Also, attention weights of the encoder 220 and the decoder 230 may be pre-trained by training the encoder 220 and the decoder 230 to generate a sequence of a recognition result from a sequence of correct answer text pairs corresponding to an input speech.

An utterance time estimation apparatus of one or more embodiments may estimate an utterance time corresponding to an output sequence based on an attention weight. For example, the utterance time estimation apparatus may estimate a point in time at which each recognized word is uttered even in a multi-head attention-based sequence-to-sequence model.

Figure 3:
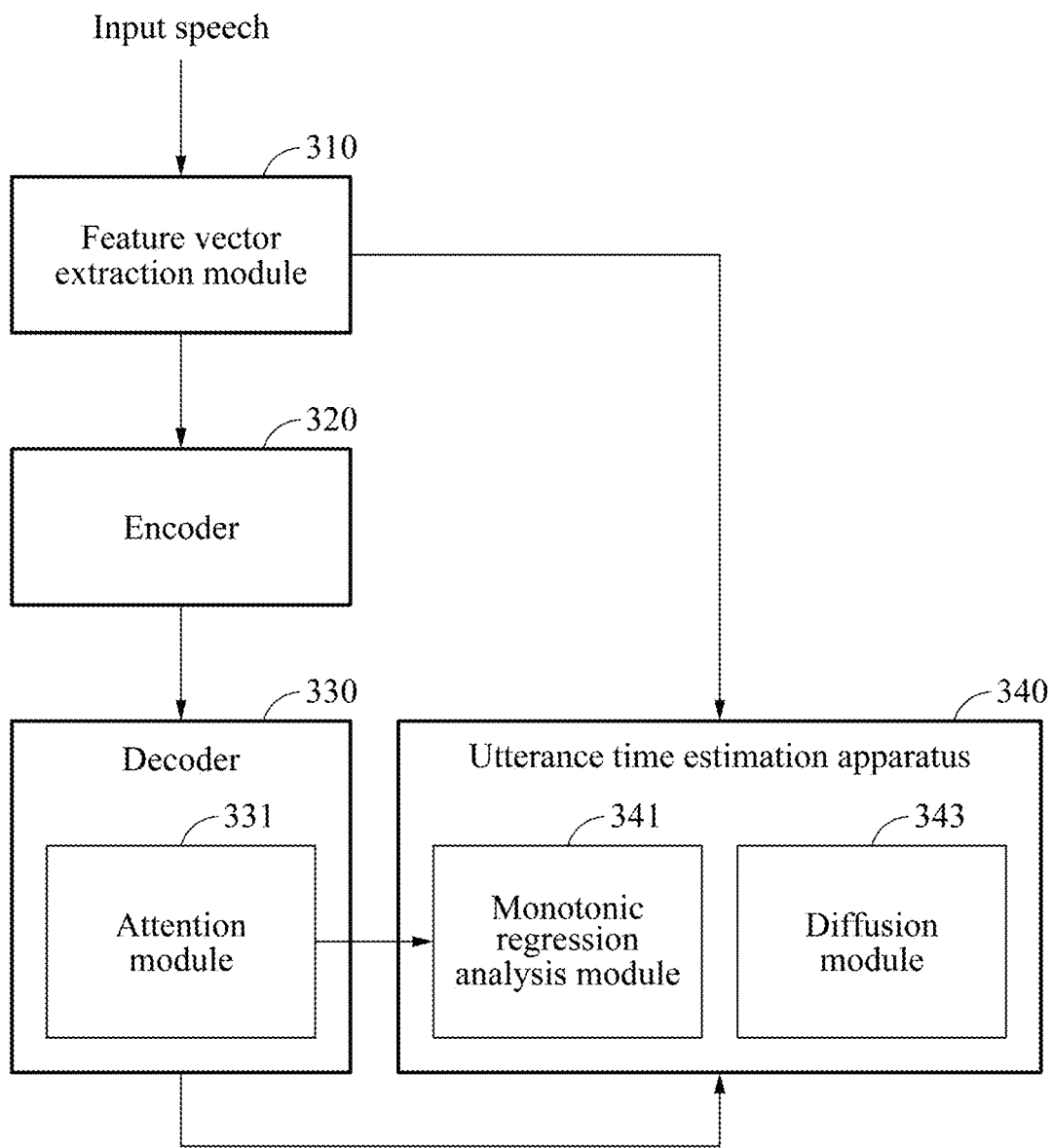
FIG. 3 illustrates an example of a speech recognition apparatus.

FIG. 3 illustrates an example of a speech recognition apparatus.

Referring to FIG. 3, the speech recognition apparatus may include a feature vector extraction module 310, an encoder 320, a decoder 330, and an utterance time estimation apparatus 340. The speech recognition apparatus may further include other components. The components of the speech recognition apparatus of FIG. 3 may be implemented as separate components or may be integrated. Hereinafter, each of the illustrated components of the speech recognition apparatus will be described in detail.

The speech recognition apparatus may use the utterance time estimation apparatus 340 to provide an output sequence that is a recognition result of an input sequence and to provide information about a point in time at which each word recognized in the output sequence is uttered.

The feature vector extraction module 310 may extract an input speech feature vector from an input speech received from a speaker. The input speech may be a speech signal including information for each of a plurality of frames, and the input speech feature vector may be a sequence of information extracted in a unit of at least one frame and may be represented as a multidimensional vector. In the following description, an input sequence may include an input speech, and an input speech feature vector extracted from the input speech, and may include information in a unit of an input frame.

The encoder 320 and the decoder 330 of FIG. 3 may respectively correspond to the encoder 220 and the decoder 230 of FIG. 2, as a non-limiting example, and accordingly further description thereof is not repeated herein. The decoder 330 may include an attention module 331 configured to determine an input frame to be further focused every time an output token is estimated in each step. For example, the attention module 331 may determine attention weights of input frames that constitute an input sequence in a corresponding step and that are used when the decoder 330 estimates output tokens for each step. The decoder 330 may estimate one or more output tokens for each step based on set attention weights. The attention module 331 may be a multi-head attention module. The multi-head attention module may divide the entire dimension into a plurality of dimensions and apply an attention multiple times, instead of applying an attention to the entire dimension one time using a plurality of attention layers that are trained to perform various functions.

The utterance time estimation apparatus 340 may include a monotonic regression analysis module 341 and a diffusion module 343. The monotonic regression analysis module 341 may further include a first attention weight matrix selection module. The utterance time estimation apparatus 340 may estimate an utterance time corresponding to an output sequence based on attention weights received from the attention module 331. Non-limiting examples of determining an attention weight will be further described below with reference to FIGS. 4A and 4B, prior to description of an operation of the utterance time estimation apparatus 340 using the monotonic regression analysis module 341 and the diffusion module 343.

Figure 4A:
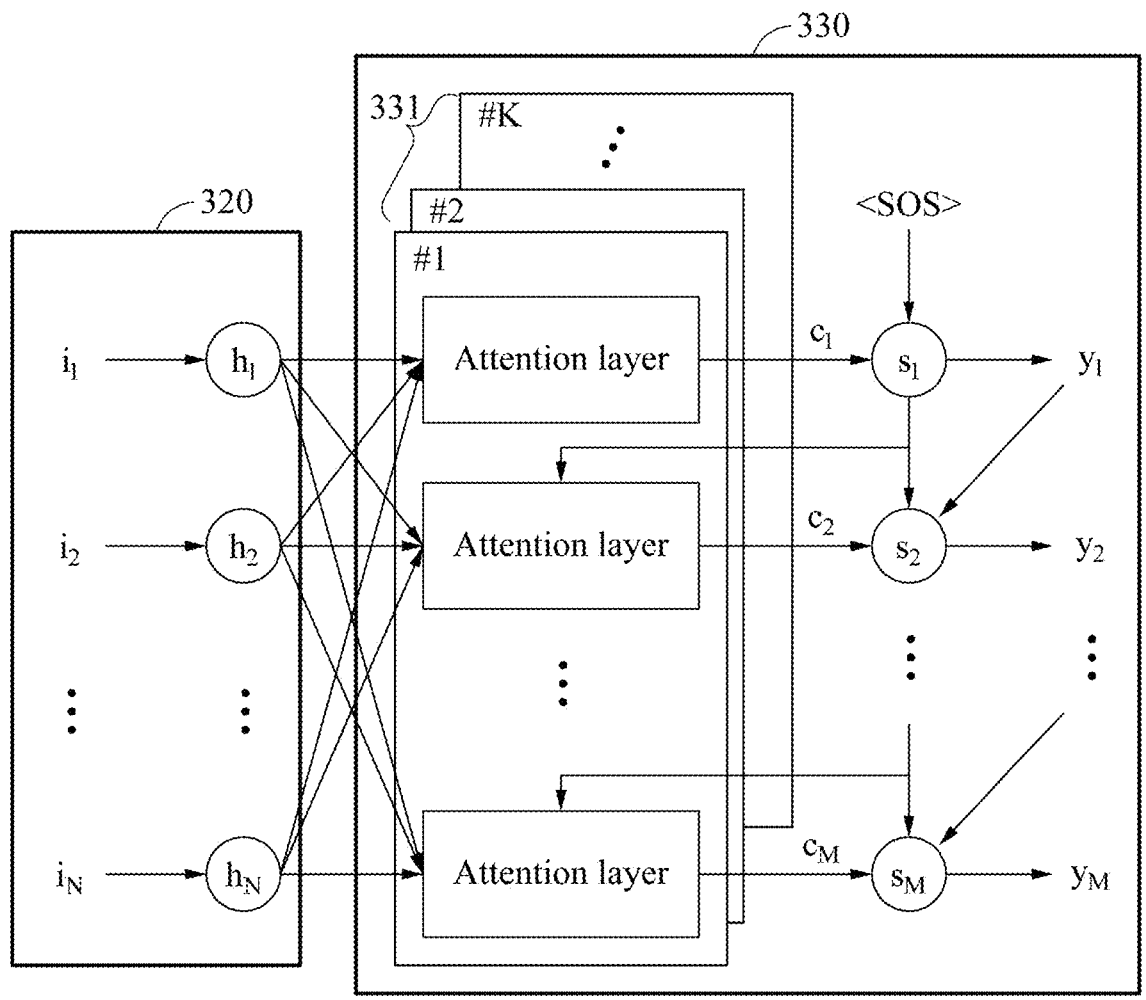
FIGS. 4A and 4B illustrate examples of determining an attention weight.
Figure 4B:
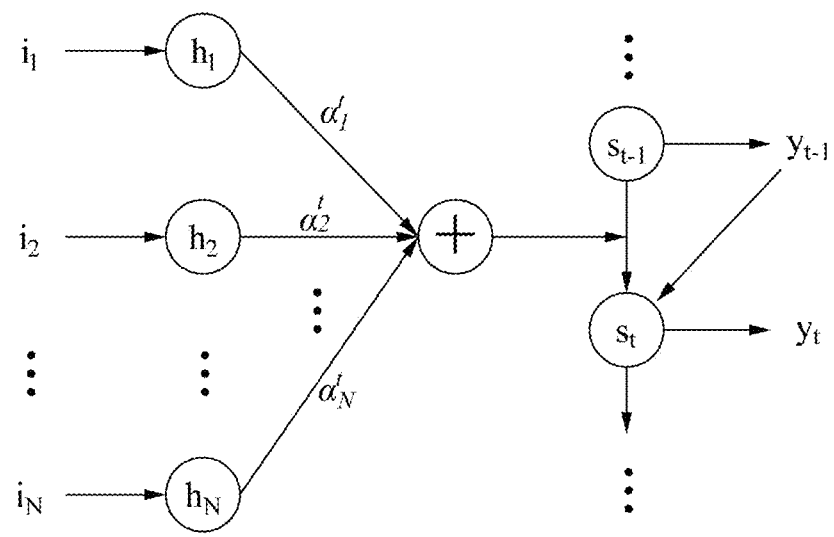

FIGS. 4A and 4B illustrate examples of determining an attention weight.

Referring to FIG. 4A, the encoder 320 may receive an input sequence including input frames (for example, frames $i_1$ through $i_N$ in which N denotes a number of input frames), and may generate hidden state vectors (for example, vectors $h_i$ through $h_N$) of the encoder 320.

The attention module 331 may determine attention weights of input frames (for example, frames $i_1$ through $i_N$) that constitute an input sequence in a corresponding step and that are used when the decoder 330 estimates output tokens for each step, and may generate context vectors (for example, vectors $c_1$ through $c_M$, in which M denotes a number of output tokens) based on the determined attention weights. For example, the attention module 331 may be a multi-head attention module and may include a plurality of attention layers (for example, a first attention layer through a k-th attention layer). Each of the attention layers may determine an attention weight in parallel, and may generate a context vector based on the determined attention weight.

The decoder 330 may receive, as inputs, a hidden state vector $s_{t-1}$ of the decoder 330 of a previous step, an output token $y_{t-1}$ of the previous step, and a context vector $c_t$ of a current step, and may extract a hidden state vector $s_t$ of the decoder 330 of the current step and an output token $y_t$ of the current step (e.g., based on the received inputs). The context vector $c_t$ of the current step used by the decoder 330 in extracting the output token $y_t$ at the current step may be determined as shown in Equation 1 below, for example.

$$C_t = \sum_{i=1}^{N} \alpha_i^t h_i \quad \text{Equation 1}$$

In Equation 1, $\alpha_i^t$ denotes an attention weight of an i-th input frame for a step t and $h_i$ denotes a hidden state vector of the encoder 320 of the i-th input frame.

Referring to FIG. 4B, $\alpha_i^t$ denotes an attention weight of an i-th input frame for a step t that is a current step, and "1" may be determined by adding attention weights $\alpha_1^t$ through $\alpha_N^t$ of all input frames (for example, a first frame through an N-th frame) for the step t. For example, when an attention weight $\alpha_2^t$ has a highest value among attention weights $\alpha_1^t$ through $\alpha_N^t$, the decoder 330 may extract an output token by focusing most on a second input frame at the step t.

Thus, based on a distribution of attention weights of input frames for the step t, which input frame is most focused on when an output token is extracted at a corresponding step may be determined, and accordingly an input frame corresponding to the output token at the corresponding step may be determined. For example, an input frame with a highest attention weight in the corresponding step may be mapped to an output token.

However, when a typical speech recognition apparatus maps an input frame with a highest attention weight in the corresponding step to an output token, two problems may occur. First, when the typical speech recognition apparatus maps an input frame with a highest attention weight in a corresponding step to an output token, a result determined by mapping an input sequence and an output sequence over time in all steps may not have monotonic properties at all times. For example, an input frame mapped in a previous step may be later in time than an input frame mapped in a current step. For example, based on the above-described method, a highest attention weight in the step t may be $\alpha_j^t$, and a highest attention weight in a step t+1 may be $\alpha_{j-k}^{t+1}$ in which k is a natural number.

Second, when a unit of time of an output token is greater than a unit of time of an input frame (e.g., at least five times (for example, a case in which a unit of an output token is a character) to 30 times (for example, a case in which a unit of an output token is a word) greater than a unit of time of an input frame), the typical speech recognition apparatus may inaccurately map an input sequence and an output sequence by determining a single input frame in a single step in which an output token is extracted.

To solve the above problems of the typical speech recognition apparatus, the utterance time estimation apparatus 340 of one or more embodiments may determine an attention weight matrix. The attention weight matrix may have, as elements, attention weights of input frames constituting an input sequence with respect to output tokens constituting an output sequence. For example, when the speech recognition apparatus outputs an output sequence, for example, "tell me a joke", the attention weight matrix may be represented by Table 1 below.

TABLE 1

|  | $i_1$ | $i_2$ | $i_3$ | $i_4$ | $i_5$ | $i_6$ | $i_7$ | $i_8$ | $i_9$ |
|---|---|---|---|---|---|---|---|---|---|
| tell | 0.9 | 0.07 | 0.02 | 0.004 | 0.001 | 0.001 | 0.001 | 0.001 | 0.001 |
| me | 0.004 | 0.02 | 0.9 | 0.07 | 0.001 | 0.001 | 0.001 | 0.001 | 0.001 |
| a | 0.001 | 0.001 | 0.001 | 0.004 | 0.33 | 0.3 | 0.36 | 0.001 | 0.001 |
| joke | 0.001 | 0.001 | 0.001 | 0.001 | 0.001 | 0.62 | 0.37 | 0.004 | 0.001 |

In Table 1, an output token may be a unit of a word, and each input frame may have a unit of 10 milliseconds (ms). In an output token "tell", an input frame $i_1$ has a highest attention weight of "0.9", an input frame $i_2$ has a second highest attention weight of "0.07", and an input frame $i_3$ has a third highest attention weight of "0.02". "0.99" may be determined by adding all the attention weights of the input frames $i_1$ through $i_3$, and accordingly it may be found that the output token "tell" is extracted by focusing on the input frames $i_1$ through $i_3$. Thus, an utterance time of the output token "tell" may be estimated to an amount of time of "0" to "30" ms. In an example, for a given output token (e.g., "tell"), the utterance time estimation apparatus 340 may iteratively sum the highest attention weight (e.g., "0.9") with a next highest attention weight until the iterative sum meets a threshold (e.g., "0.99"), and may determine an utterance time of the given output token to be from a time of an input frame of the highest attention weight through a time of an input frame of a lowest attention weight among the attention weights used to obtain the iterative sum.

The utterance time estimation apparatus 340 may correct the attention weight matrix based on a predetermined condition, may perform a monotonic regression analysis on the corrected attention weight matrix, and may estimate an utterance time corresponding to an output sentence based on the attention weight matrix.

For example, when a plurality of weight matrices are generated by performing a multi-head attention, the utterance time estimation apparatus 340 may select a first weight matrix satisfying a predetermined condition, and may estimate an utterance time corresponding to an output sentence based on the selected first weight matrix. Non-limiting examples of a method of estimating an utterance time will be further described below with reference to FIGS. 5 through 9B.

Figure 5:
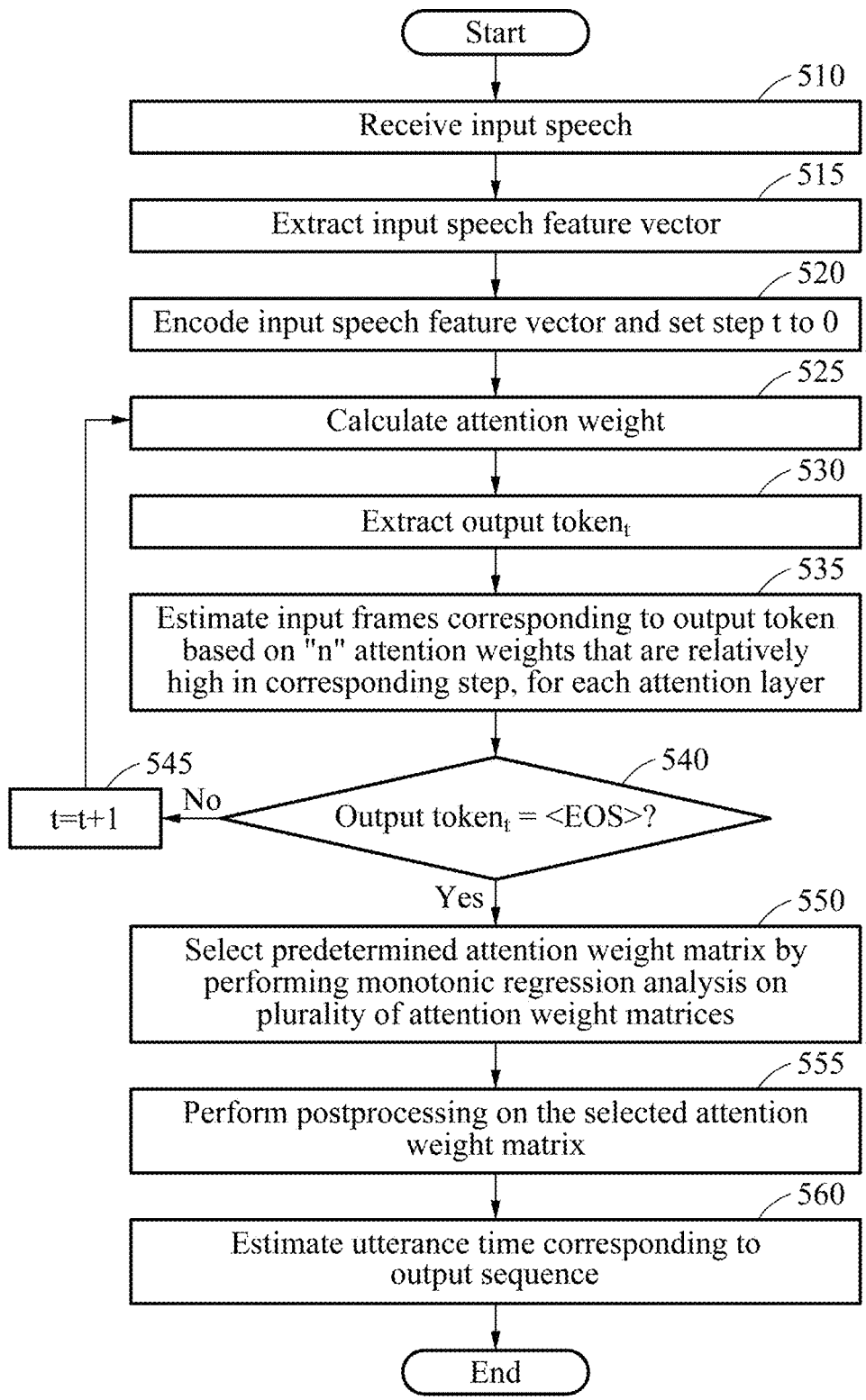
FIG. 5 illustrates an example of a method of estimating an utterance time.

FIG. 5 illustrates an example of a method of estimating an utterance time.

Referring to FIG. 5, operations 510 through 560 may be performed by, for example, a speech recognition apparatus. The speech recognition apparatus may be implemented by or include, as a non-limiting example, at least one hardware module that may include one or more processors configured to execute instructions to perform operations 510 through 560. As described above, the speech recognition apparatus may include an utterance time estimation apparatus. In one or more non-limiting examples, the description of FIGS. 1 through 4B is applicable to the example of FIG. 5. For example, the operations of FIG. 5 may be implemented by a speech recognition apparatus as described above with reference to FIGS. 1 through 4B.

In operation 510, the speech recognition apparatus may receive an input speech.

In operation 515, the speech recognition apparatus may extract an input speech feature vector corresponding to the input speech.

In operation 520, the speech recognition apparatus may encode the input speech feature vector and set a current step (for example, a step t) to "0".

In operation 525, the speech recognition apparatus may calculate an attention weight at a corresponding step (e.g., the current step).

In operation 530, the speech recognition apparatus may receive, as inputs, a hidden state vector of a decoder of a previous step, an output token of the previous step, and a context vector of the current step, and may extract a hidden state vector of a decoder of the current step and an output token of the current step.

In operation 535, the speech recognition apparatus may estimate input frames corresponding to an output token of a corresponding step based on "n" attention weights that are relatively high (e.g., where "n" is a predetermined number of the highest attention weights, and/or where "n" is a minimum number of the highest attention weights that meet a predetermined threshold) in the corresponding step (e.g., the current step), for each attention layer. Also, the speech recognition apparatus may store positions of the input frames and attention weights.

Through operations 540 and 545, the speech recognition apparatus may repeatedly perform operations 525 through 535 until the output token of the current step becomes a token <EOS>. Thus, the utterance time estimation apparatus may determine an attention weight matrix that includes attention weights for all steps. For example, when a multi-head attention is performed or when a decoder includes a plurality of labels, the utterance time estimation apparatus may determine a plurality of attention weight matrices. In this example, a number of the plurality of attention weight matrices may correspond to a product of a number of attention layers and a number of decoder layers.

In operation 550, the utterance time estimation apparatus may select a predetermined attention weight matrix by performing a monotonic regression analysis on a plurality of attention weight matrices. For example, the utterance time estimation apparatus may perform a monotonic regression analysis on the plurality of attention weight matrices using a monotonic regression analysis module included in the utterance time estimation apparatus. A non-limiting example of selecting a predetermined attention weight matrix from the plurality of attention weight matrices will be further described below with reference to FIG. 6.

In operation 555, the utterance time estimation apparatus may perform postprocessing on the selected attention weight matrix. For example, the utterance time estimation apparatus may correct the selected attention weight matrix based on a preset condition, and may perform a monotonic regression analysis on the corrected attention weight matrix.

In operation 560, the utterance time estimation apparatus may estimate an utterance time corresponding to an output sequence by acquiring time information corresponding to an output token (e.g., based on the selected attention weight matrix on which the postprocessing is performed).

Figure 6:
FIG. 6 illustrates an example of selecting a predetermined attention weight matrix from a plurality of attention weight matrices.

FIG. 6 illustrates an example of selecting a predetermined attention weight matrix from a plurality of attention weight matrices.

Referring to FIG. 6, when a multi-head attention is performed, or when a decoder includes a plurality of labels, an utterance time estimation apparatus may determine the same number of attention weight matrices as a product of a number of attention layers and a number of decoder layers.

Attention weights of an attention weight matrix may be expressed in colors. For example, when an attention weight increases, the attention weight may be expressed to be close to white. When an attention weight decreases, the attention weight may be expressed to be close to black. For example, a higher attention weight may be lighter in shade than a lower attention weight, and the lower attention weight may be darker in shade than the higher attention weight. In an example, an attention weight of "1" may be white, and an attention weight of "0" may be black.

When an output sequence is estimated using a plurality of attention weight matrices, the attention weight matrices may perform different functions. For example, an attention weight matrix may correspond to noise, and another attention weight matrix may correspond to an utterance of an actual user.

The utterance time estimation apparatus may select an attention weight matrix (e.g., attention weight matrix 630) with the most monotonic properties from the plurality of attention weight matrices (e.g., a plurality of attention weight matrices 620), and may estimate an utterance time of an actual user. For example, the utterance time estimation apparatus may perform a monotonic regression analysis on the plurality of attention weight matrices, and may select an attention weight matrix having a smallest error and monotonic properties based on an analysis result from the plurality of attention weight matrices.

The utterance time estimation apparatus may estimate an utterance time corresponding to an output sequence based on the selected attention weight matrix, hereinafter, referred to as a "first attention weight matrix". When the first attention weight matrix is selected once, the utterance time estimation apparatus may estimate an utterance time corresponding to an output sequence based on the selected first attention weight matrix in response to another input sequence. For example, when the first attention weight matrix is selected once, the utterance time estimation apparatus may estimate an utterance time corresponding to an output sequence based on the selected first attention weight matrix, instead of selecting the first attention weight matrix again. A non-limiting example of estimating an utterance time corresponding to an output sequence based on a first attention weight matrix will be further described below with reference to FIG. 7.

Figure 7:
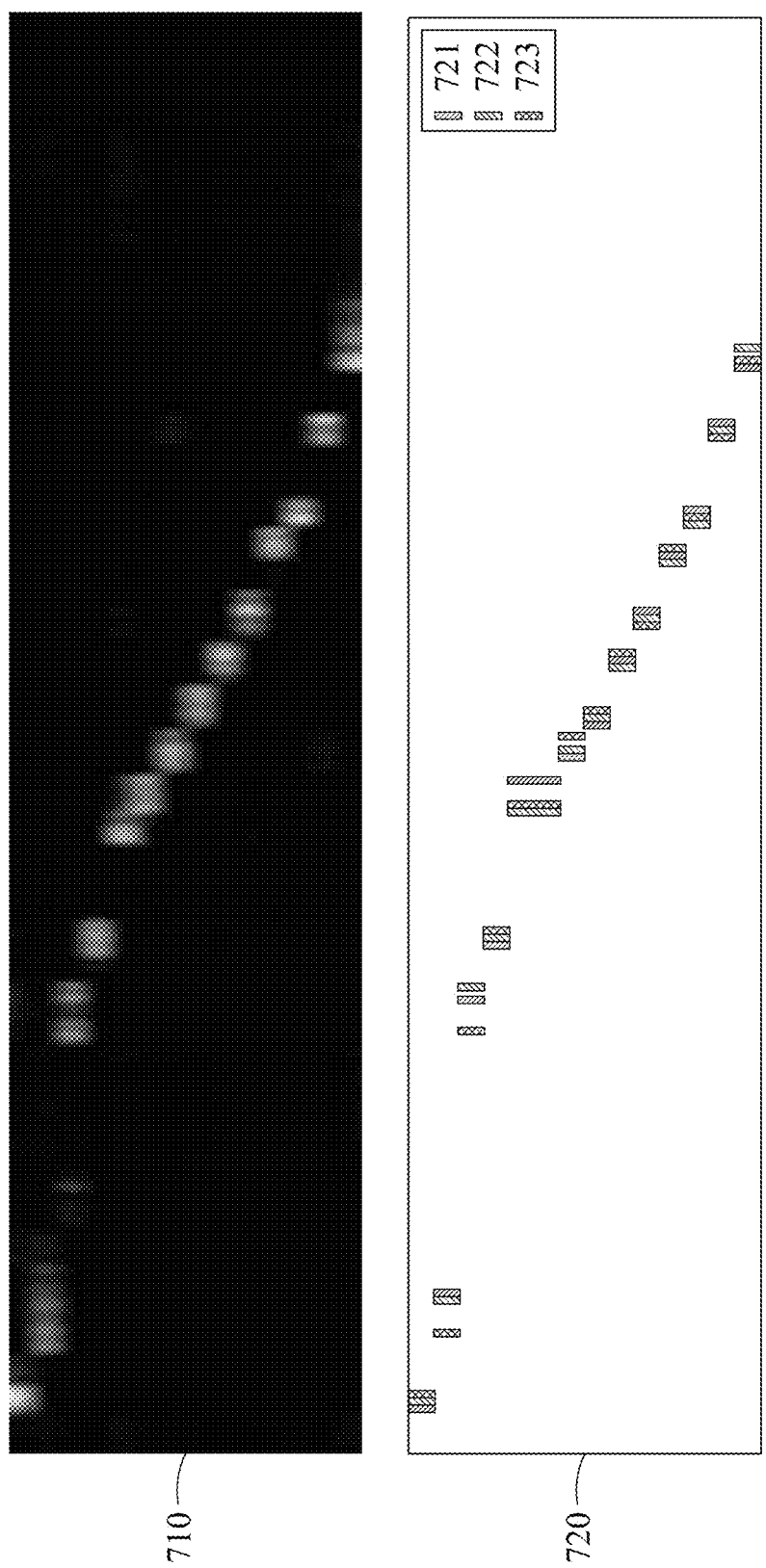
FIG. 7 illustrates an example of estimating an utterance time corresponding to an output sequence based on a first attention weight matrix.

FIG. 7 illustrates an example of estimating an utterance time corresponding to an output sequence based on a first attention weight matrix.

Referring to FIG. 7, an utterance time estimation apparatus may select a predetermined number of relatively high attention weights of input frames from attention weights of input frames corresponding to output tokens (e.g., the highest "n" attention weights among the attention weights, where "n" is the predetermined number) for each step. The utterance time estimation apparatus may estimate an utterance time corresponding to an output sequence based on the selected attention weights. The utterance time estimation apparatus may perform a monotonic regression analysis on the selected attention weights, and may estimate an utterance time corresponding to an output sequence.

Also, the utterance time estimation apparatus may correct the first attention weight matrix based on the selected attention weights, and may estimate the utterance time corresponding to the output sequence based on the corrected first attention weight matrix.

The utterance time estimation apparatus of one or more embodiments may select a plurality of attention weights instead of selecting only a highest attention weight in a corresponding step, and accordingly the first attention weight matrix may be corrected to have monotonic properties in all sections (e.g., frame sections) later, even though the highest attention weight does not have monotonic properties in all the sections.

For example, an image 720 shows that relatively high attention weights of three input frames are selected in advance from attention weights of input frames corresponding to output tokens for each step in an image 710 (e.g., an attention weight matrix), and indicates that attention weights are higher in the order of attention weights 721, 722 and 723. For example, the attention weights 721, 722 and 723 of image 720 may correspond to the attention weights in image 710. When an input frame with a highest attention weight fails to satisfy monotonic properties in all sections, the utterance time estimation apparatus may correct a section that does not satisfy monotonic properties so that monotonic properties may be satisfied in all the sections using a second highest attention weight.

The utterance time estimation apparatus may perform a diffusion correction on the first attention weight matrix, using a diffusion module. To determine a continuous input frame section, not a unit input frame corresponding to an output token, the utterance time estimation apparatus may perform the diffusion correction on the first attention weight matrix. For example, when the diffusion correction on the first attention weight matrix is performed, the utterance time estimation apparatus may determine a continuous section exceeding a predetermined threshold as an input frame section corresponding to an output token. The diffusion correction may be an operation of multiplying a transposed matrix of the first attention weight matrix by the first attention weight matrix. Through the diffusion correction, a boundary between an attention weight close to white (e.g., higher value) and an attention weight close to black (e.g., lower value) may be further clarified.

Also, the utterance time estimation apparatus may select a plurality of attention weights instead of selecting only a highest attention weight in a corresponding step, and thus the utterance time estimation apparatus of one or more embodiments may increase an accuracy of estimation by mapping a plurality of input frames to a single output token.

Figure 8A:
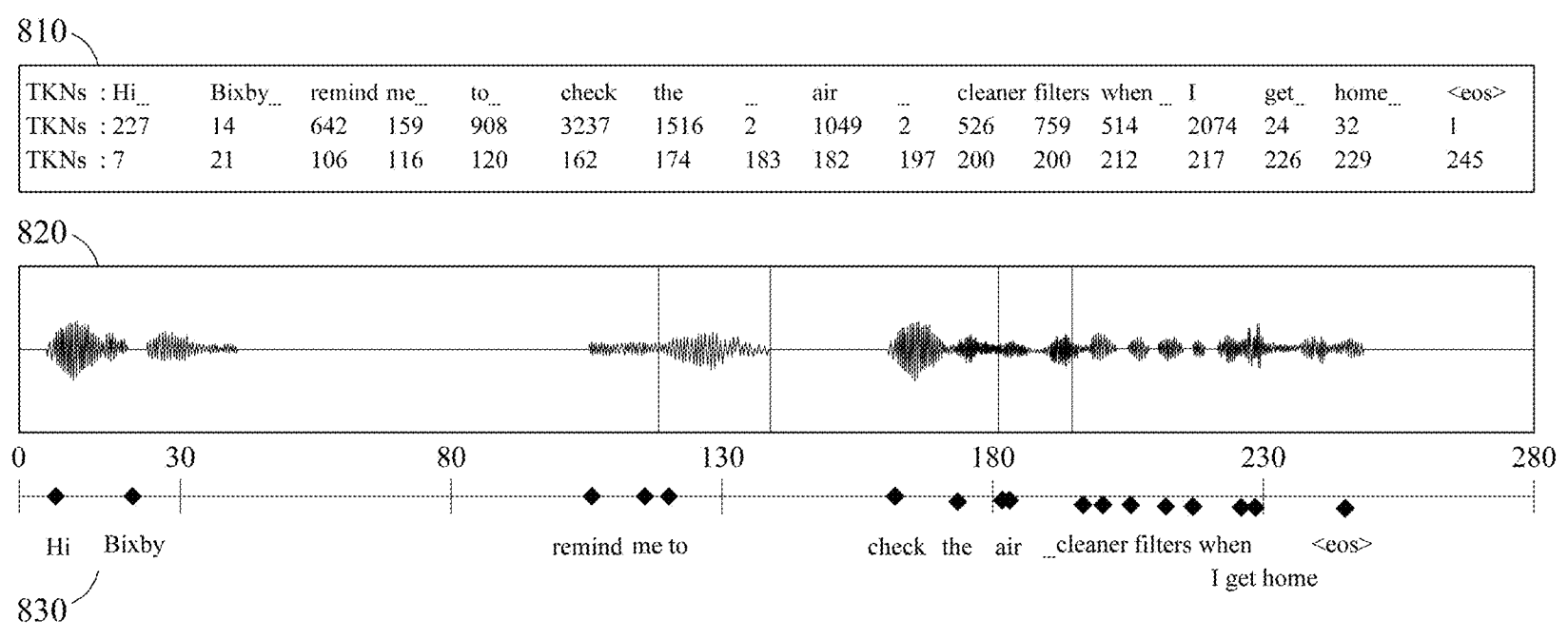

FIG. 8A illustrates an example of a result obtained by estimating an utterance time.

As shown in an image 810 of FIG. 8A, an utterance time estimation apparatus may map an input sequence 820 corresponding to an output sequence 830.

The utterance time estimation apparatus may estimate a start time of utterances of output tokens constituting the output sequence 830, as shown in the image 810. Also, the utterance time estimation apparatus may estimate an utterance time that includes a start time and an end time of the utterance of the output tokens constituting the output sequence 830.

Figure 8B:
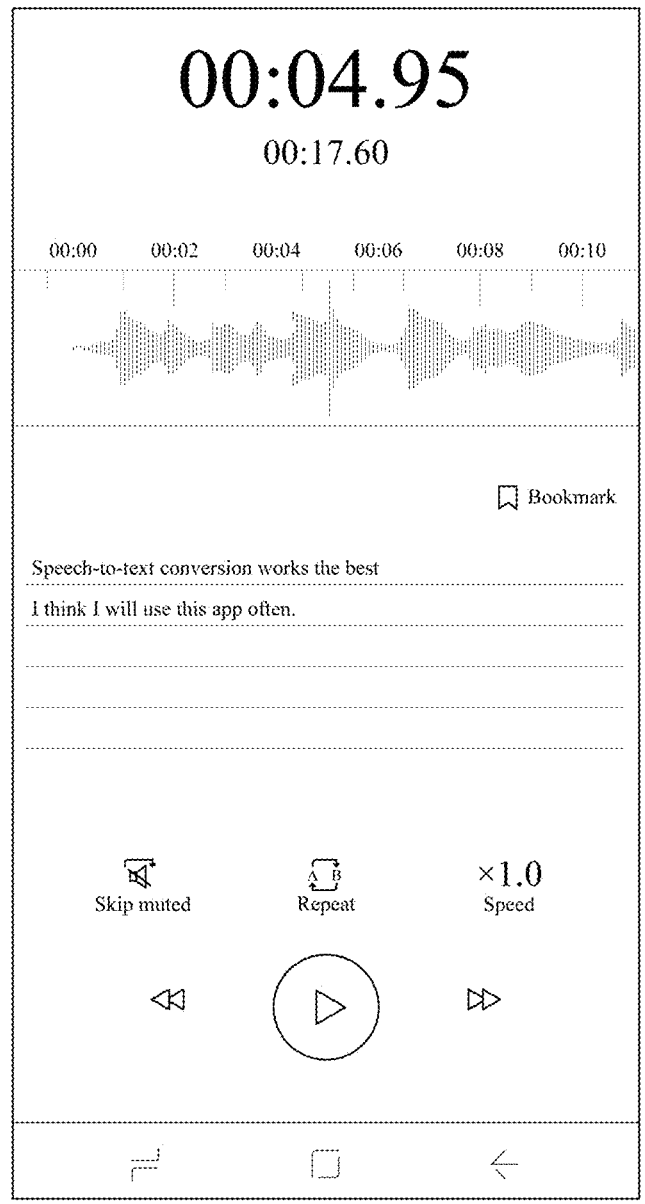
FIG. 8B illustrates an example of using an utterance time estimation result.

FIG. 8B illustrates an example of using a result obtained by estimating an utterance time.

Referring to FIG. 8B, an utterance time estimation apparatus may be used in, or may include, a speech recorder. For example, a speech recognition apparatus including the utterance time estimation apparatus may recognize texts of a recorded speech, may match the recognized texts to a waveform of the recorded speech, and may provide a user with the recognized texts matched to the waveform together with a corresponding time. Also, the speech recognition apparatus may highlight and show a word that is being uttered in accordance with a speech. In response to a user input to select a predetermined character, the speech recognition apparatus may jump to a section in which a speech corresponding to the selected character is recorded and may reproduce the speech. The utterance time estimation apparatus may be applicable to all fields in which speech recognition is performed, for example, a smart speaker, a moving image, or movies, in addition to the speech recorder. The speech recognition apparatus may receive and record the speech using at least one sensor (e.g., a microphone) of the speech recognition apparatus and may output the recognized texts, the waveform, and/or the corresponding time using either one or both of a display and a user interface of the speech recognition apparatus.

Figure 9A:
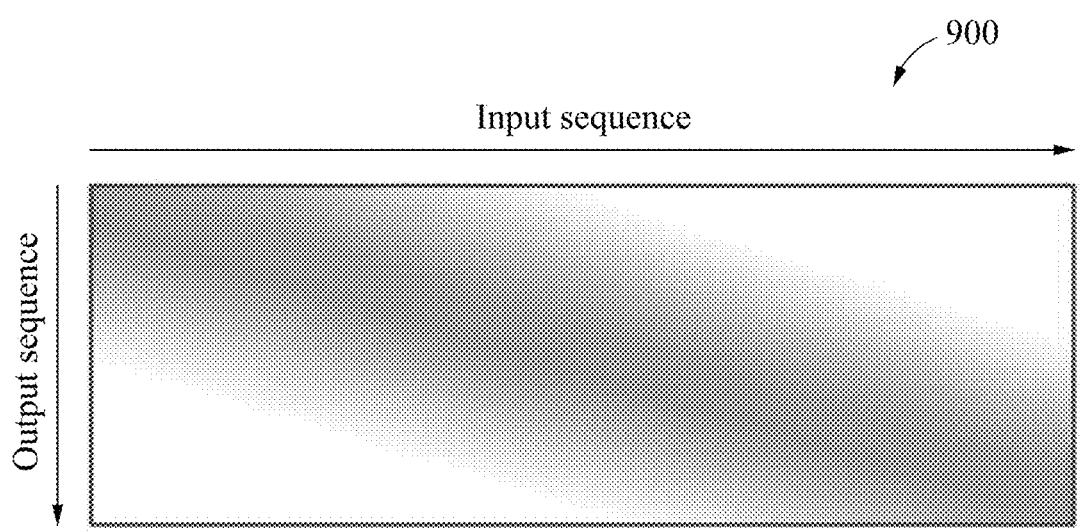
FIGS. 9A and 9B illustrate examples of training an attention-based sequence-to-sequence model.
Figure 9B:
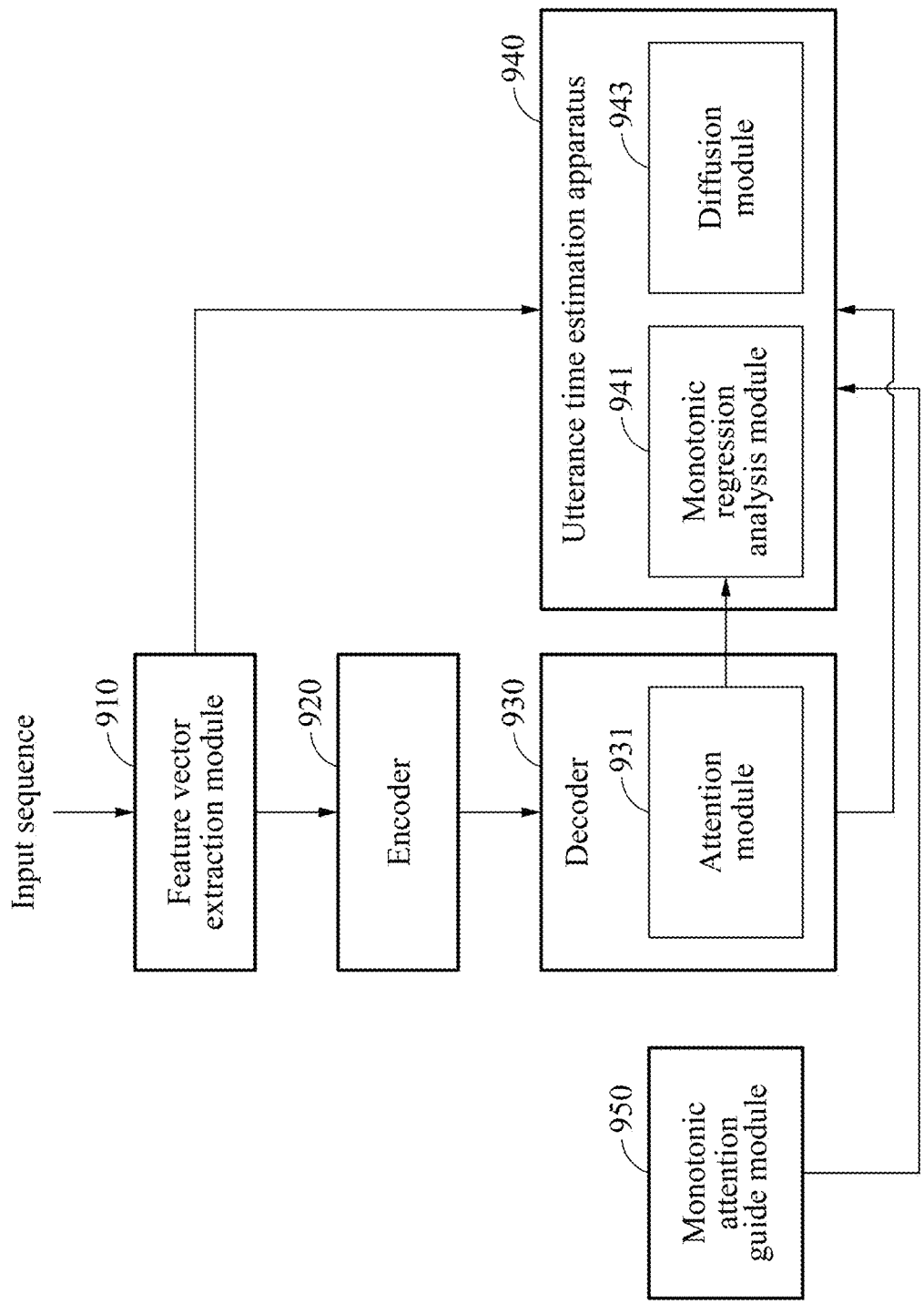

FIGS. 9A and 9B illustrate examples of a method of training an attention-based sequence-to-sequence model.

Referring to FIG. 9A, a speech recognition apparatus may train the attention-based sequence-to-sequence model so that an attention weight matrix 900 among a plurality of attention weight matrices may become (or may be generated as) a first attention weight matrix. The speech recognition apparatus may train the attention-based sequence-to-sequence model by guiding or training an attention weight matrix (for example, the attention weight matrix 900) of a predetermined attention layer to have monotonic properties from a point of time of the training, and may estimate an utterance time corresponding to an output sentence based on a trained attention weight matrix, through a monotonic regression analysis, instead of selecting a first attention weight matrix. For example, the speech recognition apparatus may mask an attention layer corresponding to the attention weight matrix 900, and may train the attention-based sequence-to-sequence model.

The description of the feature vector extraction module 310, the encoder 320, the decoder 330, the attention module 331, the utterance time estimation apparatus 340, the monotonic regression analysis module 341, and the diffusion module 343 is also applicable to a feature vector extraction module 910, an encoder 920, a decoder 930, an attention module 931, an utterance time estimation apparatus 940, a monotonic regression analysis module 941, and a diffusion module 943 shown in FIG. 9B, and accordingly further description is not repeated herein.

Referring to FIG. 9B, a speech recognition apparatus may include a monotonic attention guide module 950, instead of a first attention weight matrix selection module. The monotonic attention guide module 950 may train the attention-based sequence-to-sequence model by guiding the attention weight matrix 900 to have monotonic properties from a point of time of the training. Also, the monotonic attention guide module 950 may notify the monotonic regression analysis module 941 of the attention weight matrix 900 of the trained predetermined attention layer, so that an utterance time corresponding to an output sequence may be estimated using the attention weight matrix 900.

The monotonic attention guide module 950 may train the attention weight matrix 900 to have hard monotonic properties, or may train the attention weight matrix 900 to have soft monotonic properties by applying a constant weight to diagonal weights.

The user terminals, speech recognition apparatuses, encoders, decoders, modules, attention modules, utterance time estimation apparatuses, monotonic regression analysis modules, diffusion modules, feature vector extraction modules, monotonic attention guide modules, user terminal 110, speech recognition apparatus 120, encoder 220, decoder 230, module 310, encoder 320, decoder 330, attention module 331, utterance time estimation apparatus 340, monotonic regression analysis module 341, diffusion module 343, feature vector extraction module 910, encoder 920, decoder 930, attention module 931, utterance time estimation apparatus 940, monotonic regression analysis module 941, diffusion module 943, monotonic attention guide module 950, apparatuses, units, modules, devices, and other components described herein with respect to FIGS. 1-9B are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9B that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented utterance time estimation method, the method comprising:
    receiving an input sequence corresponding to an utterance;
    determining a plurality of attention weight matrices using an attention-based sequence-to-sequence model;
    selecting an attention weight matrix from the plurality of attention weight matrices;
    estimating an utterance time corresponding to an output sequence based on the selected attention weight matrix;
    performing a speech recognition using the estimating of the utterance time corresponding to the output sequence; and
    providing a result of the speech recognition with the utterance time.

2. The method of claim 1, wherein the selecting of the selected attention weight matrix comprises performing a monotonic regression analysis on the plurality of attention weight matrices and selecting the selected attention weight matrix based on a result of the monotonic regression analysis.

3. The method of claim 1, wherein the estimating of the utterance time comprises performing a monotonic regression analysis on the selected attention weight matrix and estimating the utterance time corresponding to the output sequence based on a result of the monotonic regression analysis.

4. The method of claim 1, wherein
    the selected attention weight matrix includes, as elements, attention weights of input frames of an input sequence and that correspond to output tokens of the output sequence, and
    the estimating of the utterance time comprises:
        selecting a predetermined number of high attention weights from the attention weights of the input frames; and
        estimating the utterance time corresponding to the output sequence based on the selected attention weights.

5. The method of claim 4, wherein the estimating of the utterance time based on the selected attention weights comprises:
    correcting the selected attention weight matrix based on the selected attention weights; and
    estimating the utterance time corresponding to the output sequence based on the corrected attention weight matrix.

6. The method of claim 4, wherein the predetermined number of the high attention weights is a predetermined number of highest attention weights among attention weights corresponding to each output token.

7. The method of claim 1, wherein the estimating of the utterance time comprises:
    performing a diffusion correction on the selected attention weight matrix; and
    estimating the utterance time corresponding to the output sequence based on the selected attention weight matrix on which the diffusion correction is performed.

8. The method of claim 1, wherein
    the selected attention weight matrix includes, as elements, attention weights of input frames of an input sequence and that correspond to output tokens of the output sequence, and
    the estimating of the utterance time comprises:
        selecting a predetermined number of high attention weights from the attention weights of the input frames;
        performing a diffusion correction on the selected attention weight matrix based on the selected attention weights; and
        estimating the utterance time corresponding to the output sequence based on the selected attention weight matrix on which the diffusion correction is performed.

9. The method of claim 1, wherein a number of the plurality of attention weight matrices corresponds to a product of a number of attention layers of the attention-based sequence-to-sequence model and a number of decoder layers of the attention-based sequence-to-sequence model.

10. The method of claim 1, further comprising:
    training the attention-based sequence-to-sequence model so that a predetermined matrix among the plurality of attention weight matrices is generated as the selected attention weight matrix.

11. The method of claim 10, wherein the training of the attention-based sequence-to-sequence model comprises masking an attention layer corresponding to the predetermined matrix and training the attention-based sequence-to-sequence model based on the masked attention layer.

12. A non-transitory computer-readable storage medium storing instructions that, when executed by a processor, configure the processor to perform the method of claim 1.

13. An utterance time estimation apparatus, the apparatus comprising:
    a processor configured to:
        receive an input sequence corresponding to an utterance;
        determine a plurality of attention weight matrices using an attention-based sequence-to-sequence model;
        select an attention weight matrix from the plurality of attention weight matrices;
        estimate an utterance time corresponding to an output sequence based on the selected attention weight matrix;
        perform a speech recognition using the estimating of the utterance time corresponding to the output sequence; and
        provide a result of the speech recognition with the utterance time.

14. The apparatus of claim 13, wherein, for the selecting of the selected attention weight matrix, the processor is configured to perform a monotonic regression analysis on the plurality of attention weight matrices and select the selected attention weight matrix based on a result of the monotonic regression analysis.

15. The apparatus of claim 13, wherein, for the estimating of the utterance time, the processor is configured to perform a monotonic regression analysis on the selected attention weight matrix and estimate the utterance time corresponding to the output sequence based on a result of the monotonic regression analysis.

16. The apparatus of claim 13, wherein
the selected attention weight matrix includes, as elements, attention weights of input frames of an input sequence and that correspond to output tokens of the output sequence, and
for the estimating of the utterance time, the processor is configured to:
select a predetermined number of high attention weights from the attention weights of the input frames; and
estimate the utterance time corresponding to the output sequence based on the selected attention weights.

17. The apparatus of claim 16, wherein, for the estimating of the utterance time, the processor is configured to:
correct the selected attention weight matrix based on the selected attention weight; and
estimate the utterance time corresponding to the output sequence based on the corrected attention weight matrix.

18. The apparatus of claim 13, wherein, for the estimating of the utterance time, the processor is configured to:
perform a diffusion correction on the selected attention weight matrix; and
estimate the utterance time corresponding to the output sequence based on the selected attention weight matrix on which the diffusion correction is performed.

19. The apparatus of claim 13, wherein
the selected attention weight matrix includes, as elements, attention weights of input frames of an input sequence and that correspond to output tokens of the output sequence, and
for the estimating of the utterance time, the processor is configured to:
select a predetermined number of high attention weights from the attention weights of the input frames;
perform a diffusion correction on the selected attention weight matrix based on the selected attention weights; and
estimate the utterance time corresponding to the output sequence based on the selected attention weight matrix on which the diffusion correction is performed.

20. The apparatus of claim 13, wherein a number of the plurality of attention weight matrices corresponds to a product of a number of attention layers of the attention-based sequence-to-sequence model and a number of decoder layers of the attention-based sequence-to-sequence model.

21. The apparatus of claim 13, wherein the processor is configured to train the attention-based sequence-to-sequence model so that a predetermined matrix among the plurality of attention weight matrices is generated as the selected attention weight matrix.

22. The apparatus of claim 21, wherein the processor is configured to mask an attention layer corresponding to the predetermined matrix and to train the attention-based sequence-to-sequence model based on the masked attention layer.

* * * * *